United States Patent [19]

Matsumae et al.

[11] Patent Number: 5,271,877
[45] Date of Patent: *Dec. 21, 1993

[54] DEBINDING PROCESS FOR REMOVING AN ORGANIC BINDER FROM A POWDER COMPACT

[75] Inventors: Toshiyuki Matsumae, Neyagawa; Isao Fuwa, Hirakata; Shusuke Matsumura, Yao, all of Japan

[73] Assignee: Matsushita Electric Works, Ltd., Japan

[*] Notice: The portion of the term of this patent subsequent to Jan. 7, 2009 has been disclaimed.

[21] Appl. No.: 592,535

[22] Filed: Oct. 3, 1990

[30] Foreign Application Priority Data

Oct. 23, 1989 [JP] Japan .................. 1-275636

[51] Int. Cl.$^5$ .............................. C04B 35/64
[52] U.S. Cl. ..................... 264/40.1; 264/63; 264/344
[58] Field of Search ............... 264/40.1, 63, 344

[56] References Cited

U.S. PATENT DOCUMENTS

| | | | |
|---|---|---|---|
| 2,939,199 | 7/1960 | Strivens | 264/63 |
| 4,795,598 | 1/1989 | Billiet | 264/63 |
| 5,078,929 | 1/1992 | Matsumae | 264/344 |
| 5,122,326 | 6/1992 | Jackson | 264/63 |

FOREIGN PATENT DOCUMENTS 61-163172 7/1986 Japan .
62-7674 1/1987 Japan .

*Primary Examiner*—Derrington, James
*Attorney, Agent, or Firm*—Stevens, Davis, Miller & Mosher

[57] ABSTRACT

A process of debinding a powder compact formed from a mixture of a sinterable powder and an organic binder utilizes a furnace for heating therein the powder compact at a pressure lower than an atmospheric pressure in order to remove an excess amount of the organic binder. A control is made to vary the furnace pressure and/or a heating rate in accordance with a monitored parameter so as to effectively and successfully removed an excess amount of the organic binder which would cause an unacceptable defect in a finished product. The parameter is selected as indicative of a condition of the furnace or a cracked gas being generated by decomposition of the organic binder, and includes, for example, a furnace temperature, density, volume, or the other measurable characteristics of the cracked gas.

7 Claims, 10 Drawing Sheets

DEBINDING PROCESS FOR REMOVING AN ORGANIC BINDER FROM A POWDER COMPACT

BACKGROUND OF THE INVENTION

1. Field of the Invention

The present invention is directed to a debinding process of heating a powder compact shaped from a mixture of a sinterable powder and an organic binder for removing an excess amount of the organic binder from within the powder compact prior to sintering.

2. Description of the prior art

In the manufacture of a powder product, it is a general practice to provide a powder compact by compacting a sinterable powder and subsequently sintering the compact into the finished powder product. An organic binder is normally added to the sinterable powder to impart fluidity to the resulting mixture for facilitating the of the powder into a desired shape by press, extrusion, injection molding or other various forming methods. Among them, injection molding is mostly preferred to form the powder product into complicated shapes. However, injection molding requires high fluidity and therefore a greater amount of the organic binder to be mixed with the sinterable powder. After forming the powder product, an excess amount of the organic binder should be removed therefrom by heat treatment prior to sintering thereof as it will certainly cause an unacceptable defect such as cracking or flaking in the sintered finished product. Consequently, the debinding process of heating the powder compact for removal of an excess amount of the organic binder therefrom is particularly important for the powder compact formed through the injection molding or the compact containing a great amount of the organic binder. Further, such a debinding or heating process should be performed carefully in order to successfully avoid the occurrence of a defect in the finished product, since wrong or improper control would certainly cause the above unacceptable defects. In fact, when the powder compact is heated too excessively or abruptly, the organic binder within the compact is rapidly decomposed to generate a cracked gas in a high amount per unit of time to thereby increase an internal gas pressure to such an extent as to cause the swelling of the compact, which eventually results in cracking or flaking in the surface of the finished product or even in the fracture thereof.

To avoid the over-heating or abrupt temperature increase, it has been proposed to monitor the furnace temperature and control the heating in accordance with a heating program for reducing the weight of the organic binder at a constant rate in a feedback manner. Although the weight reduction rate of the organic binder can be kept constant with this control, it is not always true that the volume of the cracked gas being generated by decomposition of the organic binder can be increased at a constant rate. Accordingly, the above control alone might in a certain circumstance cause an abrupt increase in the amount of the cracked gas which would result in a defect the finished product. To eliminate the above problem and therefore to make a consistent control during the debinding process, a surrounding condition other than the furnace temperature can be also found important by the reasons as discussed below with reference to FIG. 13A to 13D, which schematically illustrate the debinding process of heating a powder compact 32 formed from a mixture of a sinterable powder and an organic binder within a furnace. As the surrounding temperature of the compact 32 is increased, the organic binder contained in the compact 32 will be decomposed into a cracked gas which spreads in the surface of the compact 32 and subsequently diffuses as vaporized binder into the surrounding space, as shown in FIG. 13 B. As the temperature rises further, the decomposition of the organic binder is enhanced to fill the furnace with the ever generating cracked gas. At this occurrence, the furnace will be entirely saturated with the cracked gas if it is not discharged from the furnace, to thereby inhibit the cracked gas from emerging out of the compact surface, and consequently leave the cracked gas to solidify or become tarry in the surface of the compact, as shown in FIG. 13 C. When the decomposition proceeds further in this condition, the internal gas pressure of the compact 32 is unduly increased to eventually break the compact 32, as shown in FIG. 13D.

In order to prevent such occurrence, the cracked gas is required to be discharged out of the furnace from time to time by feeding a carrier gas in and out of the furnace to expel the cracked gas out of the furnace as being carried therethrough, or by evacuating the furnace with vacuum. The former scheme of refreshing the furnace by the carrier gas is known to be effective for oxide powders but objectionable from an economical standpoint for non-oxide powders as such powder necessitates an expensive inert gas as the carrier gas.

The latter evacuation scheme was utilized in U.S. Pat. No. 2,939,199 in which the debinding is carried out in vacuum. However, the debinding merely in vacuum cannot successfully control the volume of the cracked gas being generated and will cause the defect in the product. That is, since Boyle's law states that the volume of a given mass of gas is inversely proportional to the pressure at constant temperature; i.e., pV=constant, the volume of the cracked gas increased to a greater extent at a higher level of vacuum. With this result, when the debinding is performed in a predetermined level of vacuum, there is seen a greater expansion of the cracked gas due to the vacuum than at the atmospheric pressure, so that the volume of the gas generated in a temperature range where the decomposition is prevailing is much more increased to thereby leave corresponding voids in the compact which leads to a defect. To avoid this occurrence, it should be therefore required to regulate the vacuum level in accordance with the amount of the cracked gas being generated. Also, as taught in Japanese non-examined patent publication (KOKAI) No. 59-39775, when the debinding is carried out at a high level of vacuum of less than $10^{-3}$ mmHg, the gas will expand to a volume 1,000 times than at atmospheric pressure, which will be also a cause of a defect in the compact and therefore in the finished product.

SUMMARY OF THE INVENTION

To eliminate the above problems, the present invention is contemplated to heat a powder compact shaped from a mixture of a sinterable powder and an organic binder within a furnace while varying furnace pressure in addition to furnace temperature so as to well control the volume of a cracked gas being generated by decomposition of the organic binder in such a manner to leave no unacceptable defect in the debinded powder compact.

It is therefore a primary object of the present invention to provide an improved debinding process which is capable of eliminating defects in the powder compact prior to sintering the same into a finished product.

In the debinding process of the present invention, the powder compact is heated within the furnace at a pressure lower than atmospheric pressure in order to expedite the removal of an excess amount of the organic binder contained in the powder compact. During the heating, a control is made to vary the furnace pressure in relation to the furnace temperature being constantly monitored such that the volume of the cracked gas being generated can be well regulated to leave no critical void in the compact, thereby enabling removal of the excess amount of the organic binder without causing a blister, a fracture, or the like defect in the product. In particular, with this control of varying the furnace pressure depending upon the monitored furnace temperature, it is possible to increase the furnace pressure towards atmospheric pressure temporarily during the heating in a temperature range where the decomposition of the organic binder occurs intensively, thereby keeping the volume of the cracked gas at a reduced volume or retarding the expansion of the cracked gas, and therefore leaving no substantial defect in the powder compact or the finished product.

In preferred embodiments, delicate controls are added to vary the heating rate in accordance with monitored parameters indicative of an extent to which the decomposition of the organic binder proceeds or the condition of the cracked gas being generated by the decomposition for consistently eliminating the defect in the powder compact. Included in the parameters are density variation of a particular component of the cracked gas, the volume of the cracked gas being generated, weight reduction of the organic binder in the powder compact, and transmissivity or reflectance of the cracked gas diffused in a surrounding space of the compact or of a monitor member placed in the furnace to have the cracked gas condensed thereon. With this combination control of varying the heating rate as well as the furnace pressure, the volume of the cracked gas can be well regulated to effectively prevent defects in the compact.

It is therefore another object of the present invention to provide an improved debinding process which controls to vary the heating rate as well as the furnace pressure in accordance with the monitored condition of the cracked gas being generated so as to regulate the volume of the cracked gas, whereby effectively removing the excess amount of the organic binder to eliminate any causes which may result in a blister, a flaking, or even in the fracture of the finished product.

The above and still other objects and advantages will become more apparent from the detailed description of the following embodiments when taken in conjunction with the attached drawings.

DETAILED DESCRIPTION OF THE PREFERRED EMBODIMENTS

A powder compact, which is to be debinded or have of an organic binder removed by the present invention, is shaped from a mixture of suitable ceramic powders and an organic binder such as by injection molding or other molding techniques. The ceramic power, although not in a limited sense, includes partially stabilized zirconia, alumina, mullite, cordierite, ferrite, and oxides of nonmetallic materials, and the organic binder includes stearic acid, paraffin, butyl acetate, copolymer of ethylene and vinyl acetate, methacrylic acid butyl ester, dibutyl phthalate, polyester or the combination of two or more of the above. The powder compact, which is debinded in the following embodiments, is formed from the mixture of 55 vol% of partially stabilized zirconia and 45 vol% of an organic binder prepared from 5% by weight of stearic acid, 15% of paraffin, 40% of copolymer of ethylene and vinyl acetate, and 40% of methacrylic acid butyl ester, although the present invention should not be understood to be limited only to the particular powder compact.

First Embodiment

Figure 1:
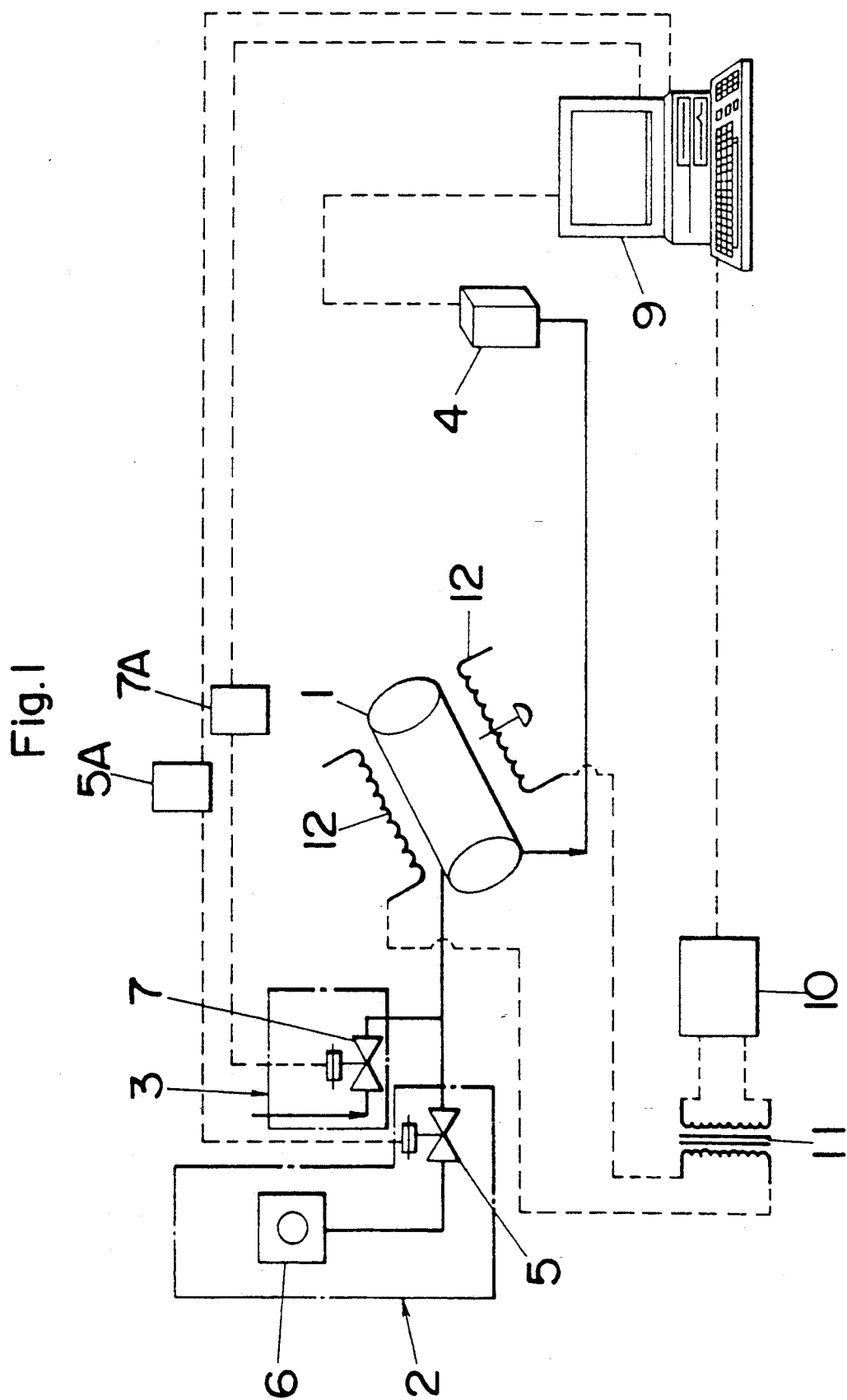
FIG. 1 is a schematic view of a system configuration for debinding a powder compact in accordance with a first embodiment of the present invention.

Referring now to FIG. 1, there is shown a system for debinding the powder compact in accordance with a first embodiment of the present invention. The system comprises a furnace 1 provided with a heater 12 for heating the powder compact in order to remove an organic binder contained therein under sub-atomic pressure conditions. The heater 12 is connected through a transformer 11 and a thyristor 10 to a programmable controller 9 so as to be controlled thereby to vary the furnace temperature in accordance with a control program stored in the controller 9. Vacuum means 2 and gas supply means 3 are provided respectively for evacuating the furnace 1 and for supplying a suitable inert gas, for example, nitrogen into the furnace 1 in order to heat the powder compact under a subatomospheric pressure with or without a presence of a surrounding gas. The vacuum means 2 includes a vacuum pump 6 and a flow control valve 5 which is driven by an actuator 5A under the control of the controller 9 so as to maintain the furnace pressure at a desired level of vacuum. The gas supply means 3 includes a like flow control valve 7 which is connected to a source of the inert gas and is driven by a like actuator 7A under the control of the controller 9 to vary the amount of the gas introduced into the furnace 1. A pressure sensor 4 provided for constantly monitoring the furnace pressure 1 is also connected to feed instantaneous pressure data to the controller 9 such that the controller 9 can operate the valves 5 and 7 depending upon a difference between the monitored furnace pressure and a reference pressure stored in a memory of the controller 9. That is, the furnace pressure can be maintained at a desired vacuum level in a feedback manner by respectively regulating the flow rates of the gases drawn from and into the furnace at the valves 5 and 7. In this manner, the debinding of the powder compact can be effected at an optimum environmental condition, as discussed below.

Figure 2A:
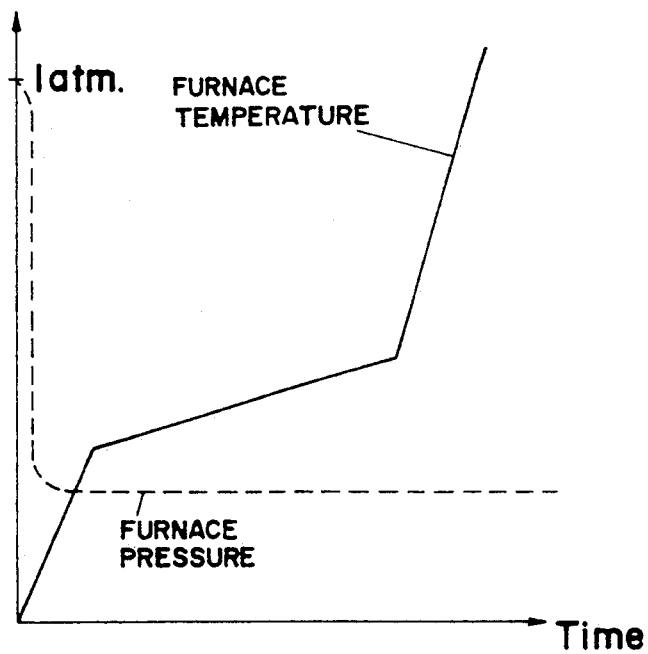
FIGS. 2A and 2B are respectively graphic representations of changes in furnace pressure and temperature seen in a debinding process using the above system of FIG. 1.
Figure 2B:
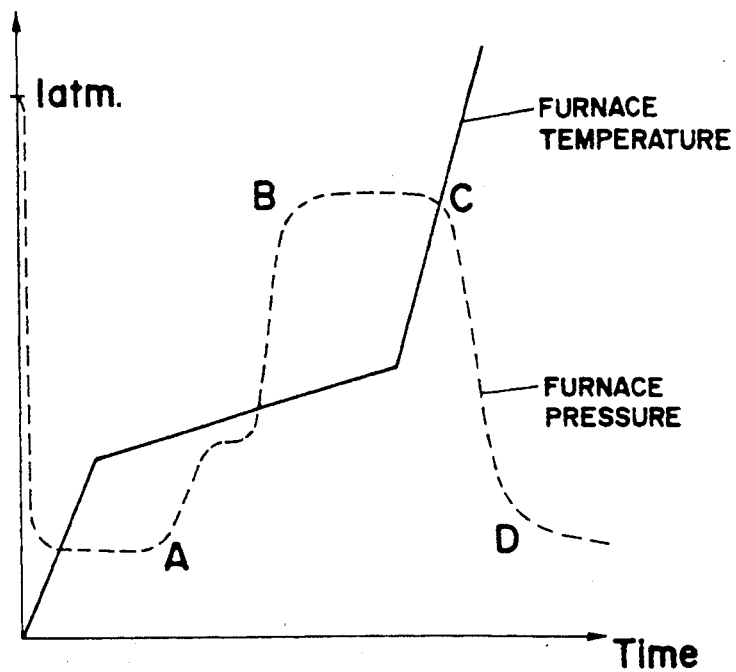

FIGS. 2A and 2B illustrate relationships between the furnace temperature and pressure when the powder compact is heated at a fixed vacuum level and at a varying vacuum level, respectively for removing the organic binder. When the powder compact is heated at a fixed vacuum level, as shown in FIG. 2A, the organic binder contained within the powder compact will be decomposed to generate a corresponding cracked gas as the temperature rises. At an elevated temperature, the decomposition will occur intensively to generate the cracked gas at an increased rate. When this occurs, cracked gas expansion is expedited due to the vacuum, i.e., decreased pressure level in the furnace, as known from the gas law, pV=constant. If this occur, the powder compact would certainly break into pieces due to the abruptly expanded cracked gas. Accordingly, a control should be made to increase the furnace pressure or lower the vacuum level at a temperature range where the decomposition of the organic binder occurs intensively, as illustrated in FIG. 2B. The control is made in accordance with a program stored in the controller 9 in order to reduce the volume of the cracked gas being generated to a minimum low enough to present a debinded powder compact free from a crack or blister leading to the fracture of the compact. As shown in FIG. 2B, the debinding process starts to raise the furnace temperature and to vacuum the furnace 1 for heating the powder compact at a reduced furnace pressure level or high vacuum level to a point [A]. Subsequently, the temperature is continuously raised while increasing the furnace pressure or decreasing the vacuum level to a point [B] where the intensive decomposition begins. The lowered vacuum level is maintained to a point [C], after which it is again increased toward the initial vacuum level to a point [D].

With this control of varying the vacuum level of the furnace 1 in accordance with the temperature rise, it is possible to restrain the expansion of the cracked gas in the powder compact, presenting a debinded compact free from the defect. In the above embodiment, the vacuum level is varied by the use of the controller 9 with the valves 5 and 7 and the drivers thereof. However, such system configuration is given by way of example only and the present invention should not be limited thereto and may use other suitable system configurations.

Second Embodiment

Figure 3:
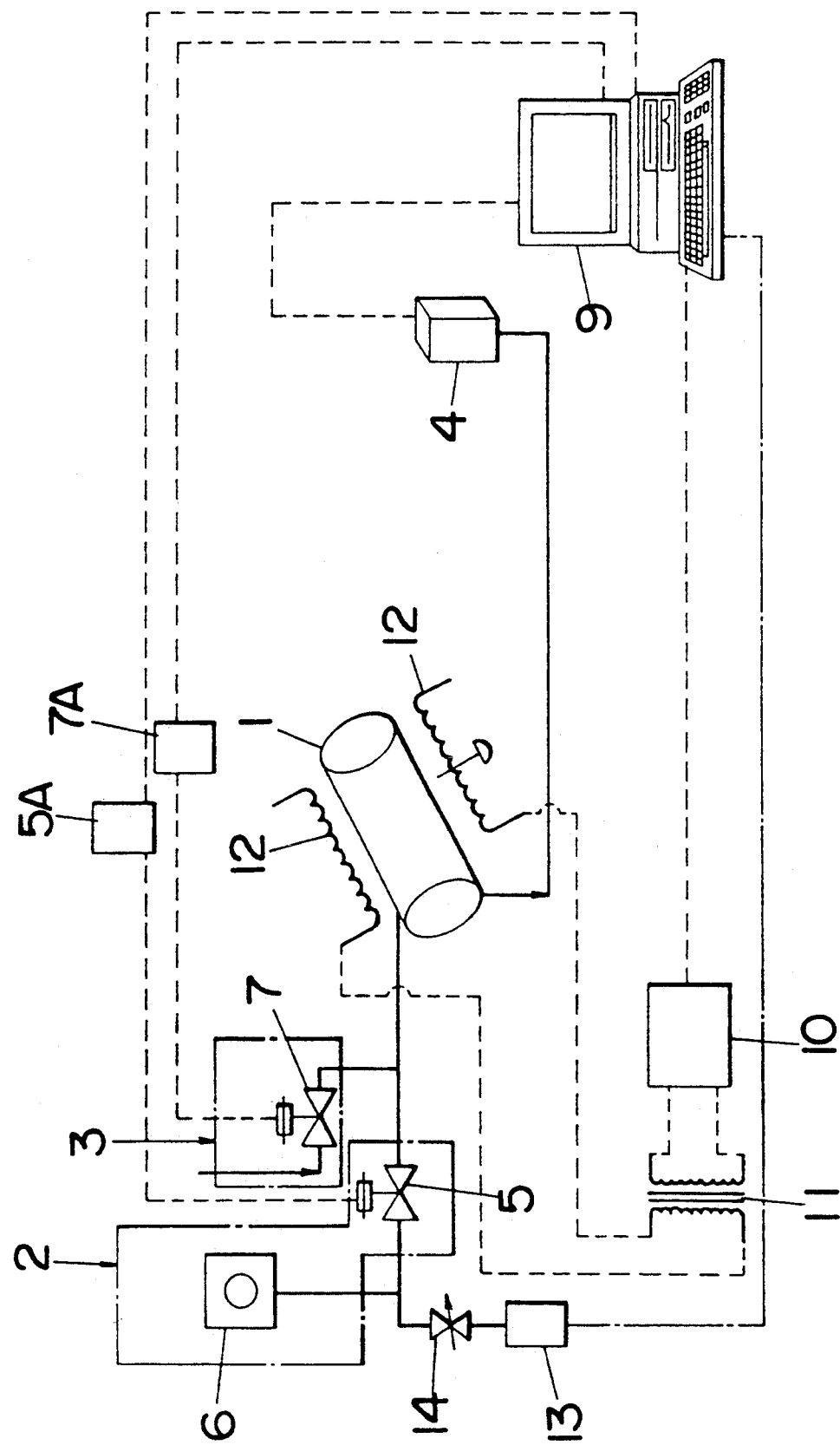
FIG. 3 is a schematic view of a system configuration for debinding a powder compact in accordance with a second embodiment of the present invention.
Figure 4:
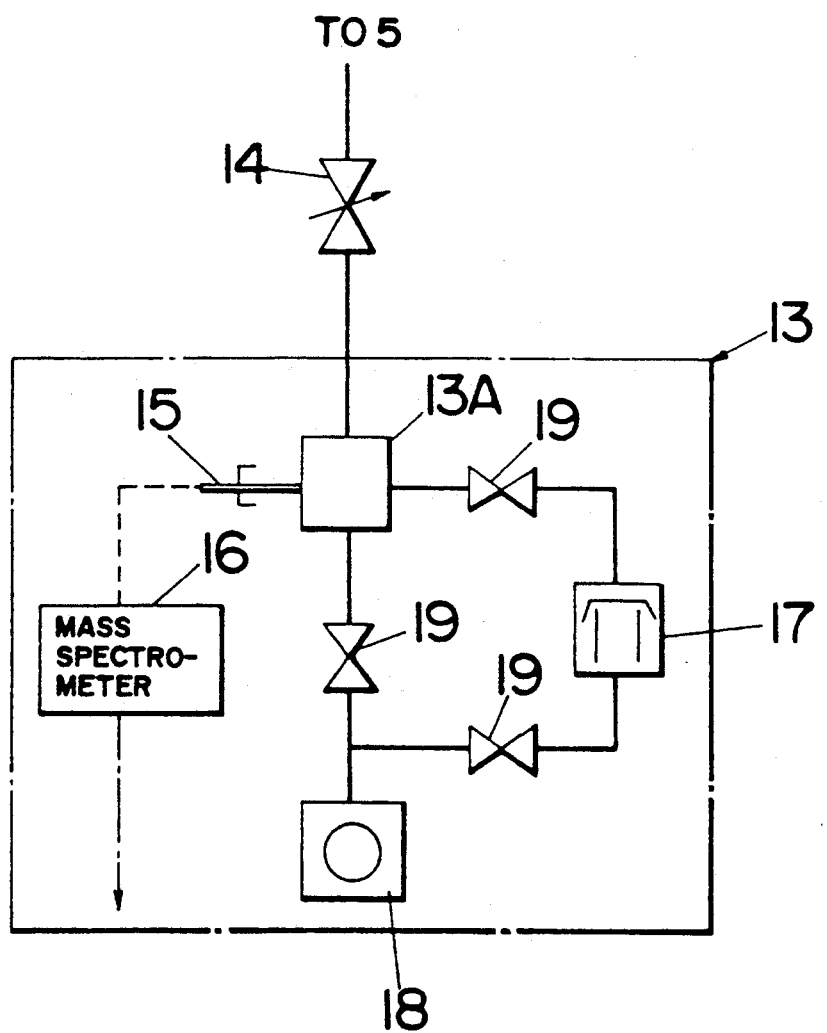
FIG. 4 is a schematic view of a decomposed gas detector utilized in the above debinding system of FIG. 3.

FIG. 3 illustrates a debinding system for use in a debinding process of a second embodiment of the present invention, which is characterized by control of the furnace pressure as well as the furnace temperature in accordance with variations in density of a particular component or components of the cracked gas. The system configuration is identical to that of FIG. 1 except for a cracked gas detector 13 provided to monitor a particular component or components of the cracked gas being generated by the decomposition of the organic binder. Therefore, like numerals designates like components for an easy reference purpose. The cracked gas detector 13 comprises a chamber 13A (FIG. 4) which communicates with the furnace 1 through a needle valve 14 and through the valve 5 and which has its interior maintained at $10^{-5}$ torr by the use of a rotary pump 18, oil diffusion pump 17, and a set of flow control valves 19. The chamber 13A has a sensor 15 which provides an output concerning a particular component or components of the cracked gas. The output is fed to a mass spectrometer 16 where it is examined to provide molecular weight data of the desired component or components of the cracked gas to the programmable controller 9. The molecular weight data is processed to provide a corresponding partial pressure level with respect to the particular component or components. The partial pressure level is then compared with a predetermined reference level stored in the memory of the controller 9 to provide a difference therebetween. Based upon thus obtained the opening amount of the valves 5 and 7 to successively control the furnace pressure or vacuum level at an optimum level.

Figure 5A:
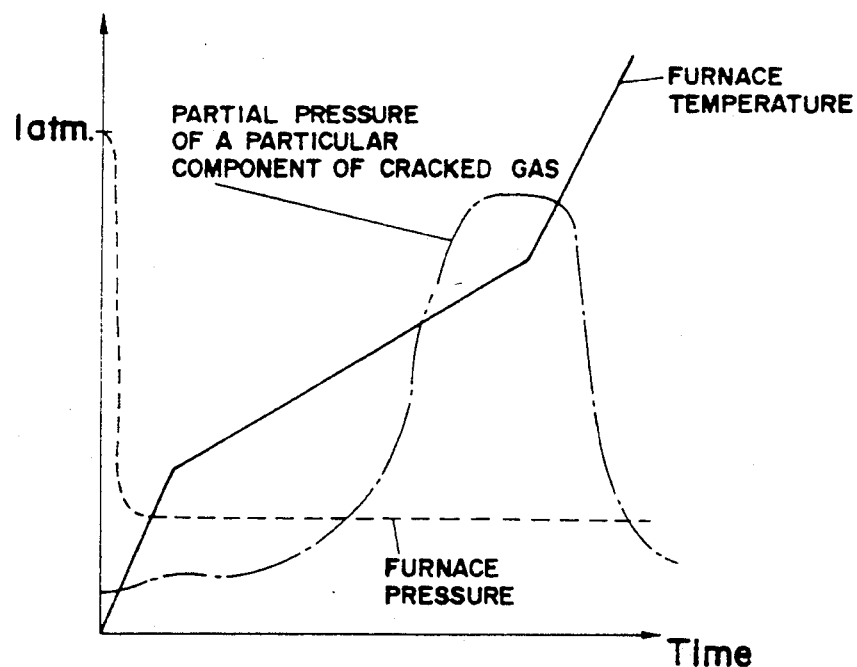
FIGS. 5A and 5B are respectively graphic representations of changes in furnace pressure, temperature, and density of a particular component of a cracked gas being generated in a debinding process using the system of FIG. 3.
Figure 5B:
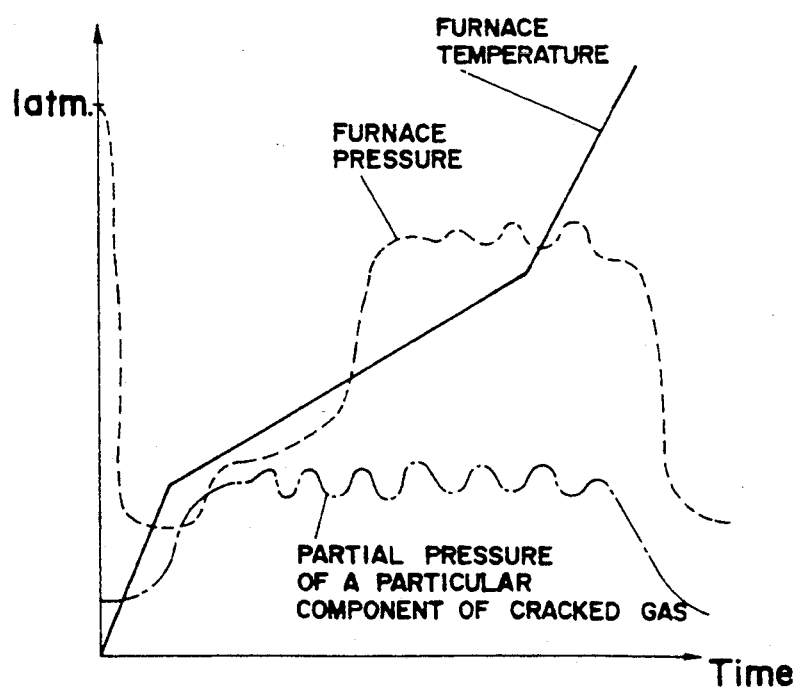

FIGS. 5A and 5B illustrate relationships among the furnace temperature, furnace pressure, and the partial pressure level of the particular component of the cracked gas when the powder compact is heated at a fixed vacuum level and at a varying vacuum level, respectively for removing the organic binder. As shown in FIG. 5A, when the debinding is carried out at a fixed vacuum level, the cracked gas will expand remarkably due to the vacuum at a temperature range where the decomposition occur intensively, resulting an excess volume of the cracked gas left in the powder compact. This, as discussed above, eventually leads to the fracture of the powder compact. To avoid this problem, a control is made in the present embodiment to vary the furnace pressure in accordance with the monitored density or the partial pressure level of the particular component or components, as shown in FIG. 5B. In other words, the controller 9 is programmed such that the mass spectrometer 16 sees a constant density or partial pressure for the particular component, for example, having a molecular weight of 28. That is, when the monitored level becomes greater than the reference level, indicative that the decomposition becomes intensified, the controller 9 operates to introduce a surrounding inert gas through the gas supply means 3 into the furnace 1 and at the same time to restrict the gas evacuation, increasing the furnace pressure level or decreasing the vacuum level. The inert gas is introduced to lower the partial pressure of the component having a molecular weight of 28 until the monitored level reaches the reference level. Therefore, a substantial decomposition of the organic binder can be made in the presence of the inert gas and at a reduced vacuum level so that the cracked gas is inhibited from expanding, thereby assuring the defect free debinding of the powder compact. Although, the component having a molecular weight of 28 is selected for monitoring the condition of the cracked gas decomposition in the above embodiment, it is of course equally possible to select other components of difference molecular weight as required. Further, the condition of the cracked gas decomposition could be monitored by other suitable instruments than a mass spectrometer.

Third Embodiment

In a third embodiment of the present invention, it is contemplated to detect a volume of the cracked gas being generated by the decomposition of the organic binder for controlling to vary the furnace pressure and the heating rate depending upon the detected volume of the cracked gas. The system configuration utilized in the third embodiment is identical to that of FIG. 1, and is deemed unnecessary to repeat here. In operation, the pressure detector 4 constantly monitors the pressure of the furnace to provide a volume of the cracked gas being generated per unit of time, which is processed at the controller 9 in order to have a constant per unit of time gas volume by regulating the valves 5 and 7. In other words, the furnace pressure is controlled by regulating the evacuation rate as well as the flow rate of the surrounding gas into the furnace 1 to maintain the per-unit of time cracked gas volume at an optimum level.

Figure 6A:
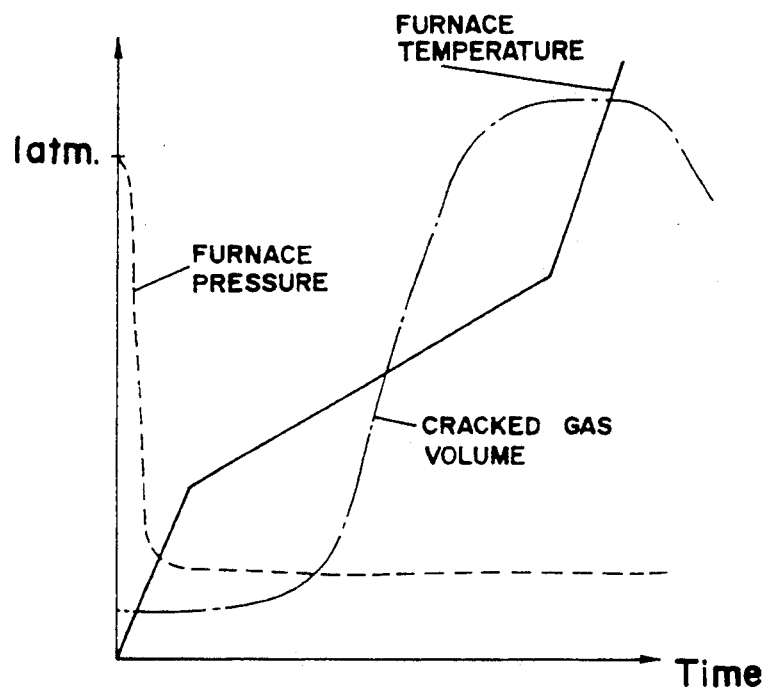
FIGS. 6A and 6B are respectively graphic representations of changes in furnace pressure, temperature, and volume of a cracked gas being generated in a debinding process using the system of FIG. 3 in accordance with a third embodiment of the present invention.
Figure 6B:
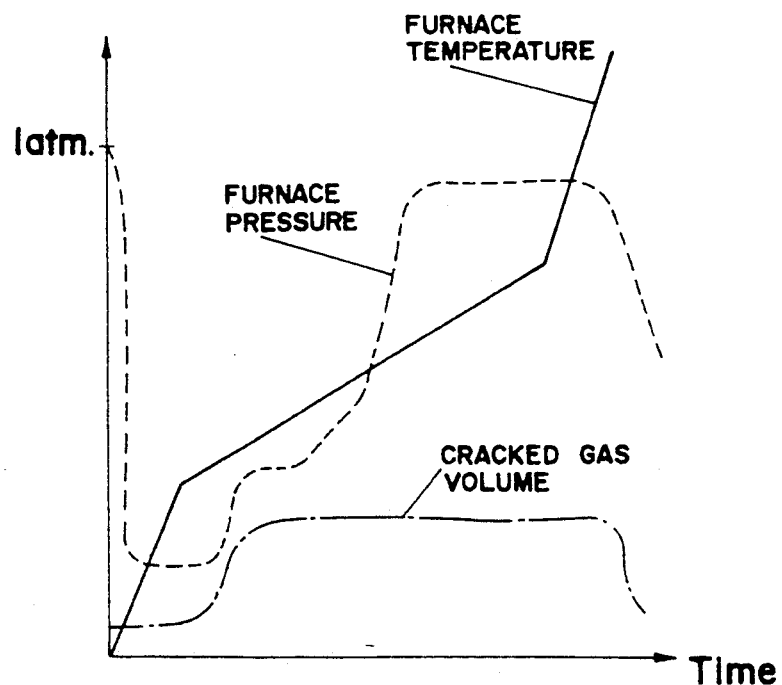

FIGS. 6A and 6B illustrate relationships among the furnace temperature, furnace pressure, cracked gas volume when the powder compact is heated at a fixed vacuum level and at a varying vacuum level, respectively for removing the organic binder. As shown in FIG. 5A, when the debinding is carried out at a fixed vacuum level, the cracked gas will expand remarkably due to the vacuum at a temperature range where the decomposition occurs intensively, resulting an excess volume of the cracked gas in the powder compact. This, as discussed hereinbefore, leads to the fracture of the powder compact. On the contrary, the present embodiment is contemplated to control the furnace pressure in such a way as to have a constant per-unit time volume of the cracked gas being generated over a temperature range where the substantial or intensive decomposition of the organic binder occurs, as seen in FIG. 6B. That is, when the furnace 1 is heated to a temperature where the organic binder becomes intensively decomposed into the cracked gas to cause a corresponding change in the per-unit time volume of the cracked gas, the controller 9 acts to increase the furnace pressure in order to have a constant per-unit time volume generation of the cracked gas, thereby reducing the volume of the cracked gas to an acceptable level enough to avoid defects in the powder compact.

Fourth Embodiment

Figure 7:
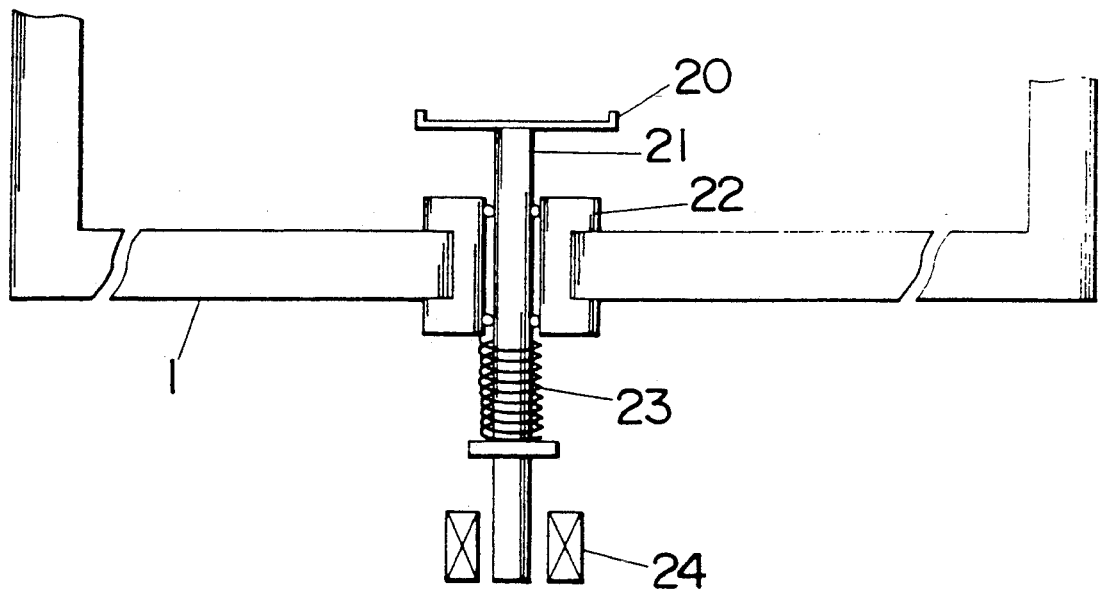
FIG. 7 is a partial view illustrating a carrier for the powder compact disposed in the furnace together with associated parts utilized in a debinding process in accordance with a fourth embodiment of the present invention.
Figure 8:
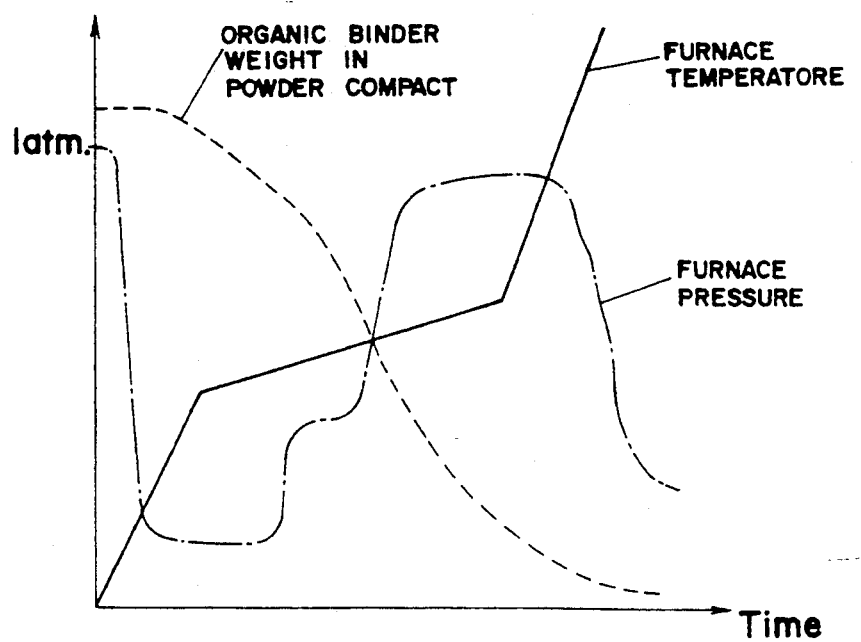
FIG. 8 is a graphical representation of changes in furnace pressure, temperature, and binder weight in the debinding process of the fourth embodiment.

A fourth embodiment of the present invention utilizes a system configuration which is basically identical to that of FIG. 1 but further includes a tray 20 within the furnace for supporting the powder compact thereon. As shown in FIG. 7, the tray 20 has a shaft 21 which extends downward through a bottom of the furnace 1 into a differential transformer 24. A hermetic seal 22 is provided between the shaft 21 and the furnace 1. The tray 20 is biased upward by means of tension spring 23 disposed around the shaft 21 so that it moves upward as the weight of the powder compact reduces in the debinding process. The corresponding displacement of the shaft 21 is detected by the differential transformer 24 which provides a signal indicative of a change in the weight of the powder compact to the controller 9. The signal is therefore also indicative of the weight of the organic binder removed from the powder product being subjected to the debinding treatment. At the controller 9 which is also connected to the pressure sensor 4 to monitor the furnace pressure, a control is made to vary the furnace pressure, in addition to the furnace temperature, based upon the detected weight change of the powder compact, or the organic binder. That is, the furnace pressure is controlled by actuating the valves 5 and 7 to regulate the evacuation rate and the surrounding gas introduction rate, and the furnace temperature is varied at the thyristor 10 under the control of the controller 9. The debinding process of the present embodiment will be discussed with reference to FIG. 8 which illustrates a relationship among the furnace temperature, furnace pressure, and the weight of the organic binder in the powder compact. As shown in the FIGURE, at the very start of the debinding process or heating the furnace at increased rates, the organic binder is not yet decomposed to have no substantial weight reduction of the organic binder in the powder compact, thereby causing no substantial change in the output of the differential transformer 24. As the furnace temperature rises, the organic binder starts to be decomposed so that the weight of the powder compact or the organic binder contained therein will be reduced. Then, the differential transformer 24 detects a corresponding displacement of the shaft 21 to provide an output indicative of that weight reduction. When the furnace temperature further rises sufficiently to cause the substantial or intensive decomposition, there is seen a remarkable weight reduction in the organic binder to thereby provide a critical change in the output of the differential transformer 24. At this occurrence, the controller 9 responds to lower the heating rate, and at the same time to increase the flow rate of the surrounding gas into the furnace 1 and decrease the evacuation rate to thereby lower the vacuum level or raise the furnace pressure, thus keeping the volume of the cracked gas at a reduced level to avoid the defect in the debinded powder compact. The differential transformer 24 may be replaced by other suitable device as required.

Fifth Embodiment

Figure 9:
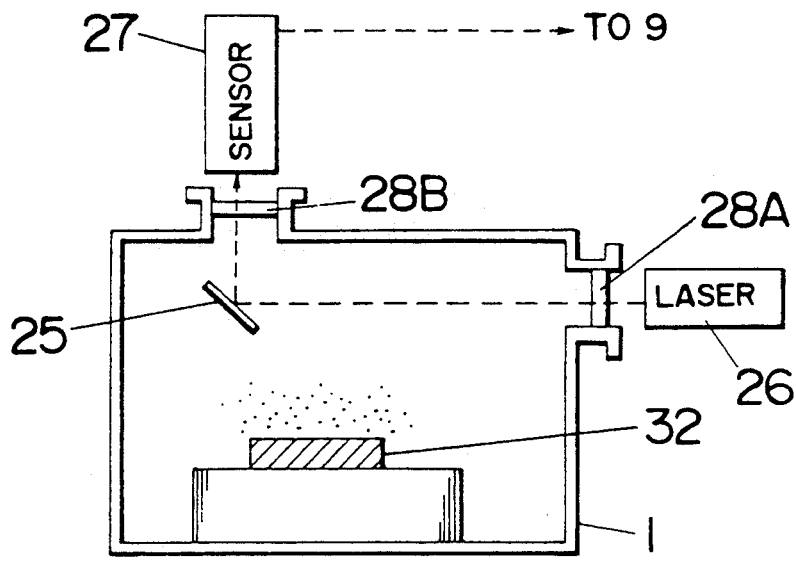
FIG. 9 is a schematic view of a furnace including a reflector utilized in a debinding process in accordance with a fifth embodiment of the present invention.
Figure 10:
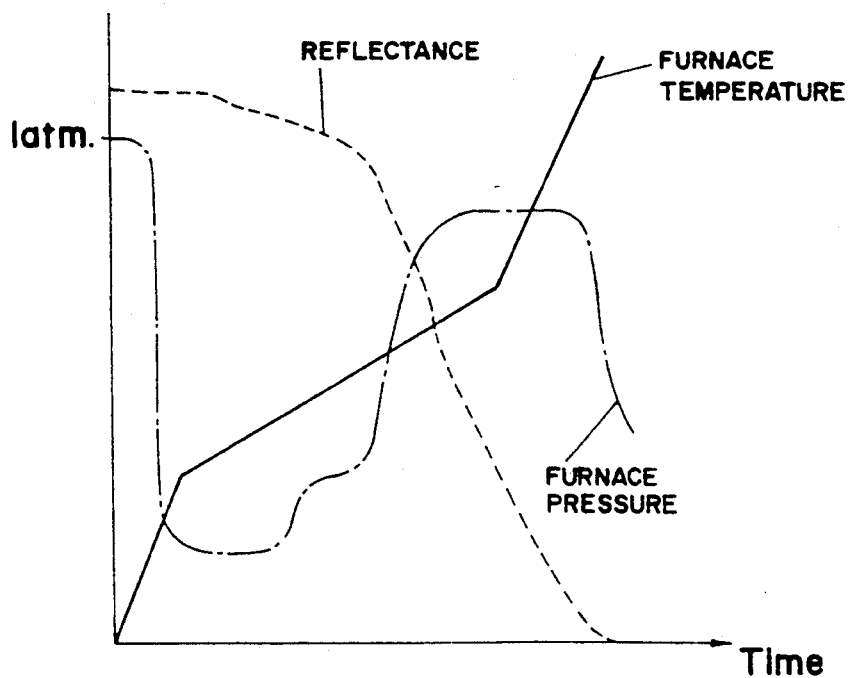
FIG. 10 is a graphical representation of changes in furnace pressure, temperature, and reflectance of the reflector of FIG. 9.

A fifth embodiment of the present invention utilizes a system configuration which is identical to that of FIG. 1 but further includes a monitor member for analysis of the condition in the furnace 1. As shown in FIG. 9, a reflector 25 with a water-cooled jacket is utilized as the monitor member and placed in the furnace 1 above a powder compact 32 so that the cracked gas can be cooled on the reflector surface to form deposition of the organic binder thereon. A laser beam emitter 26 is disposed outside of the furnace 1 to direct, for example, He - Ne laser beam toward the reflector 25 through a window 28A. The reflected beam from the reflector 25 is directed through a window 28B to a photo-sensor 27 which provides an output signal indicative of the intensity of the reflected laser beam to the controller 9. As the decomposition proceeds, more a greater amount of the organic binder is removed from the powder compact 32 in the form of the cracked gas and is deposited on the reflector 25 to correspondingly lower the reflectance or the intensity of the laser beam received on the photo sensor 27, the output signal from the photo sensor 27 is also indicative of the condition of the powder compact being subjected to the heat treatment. In response to the detected reflectance of the reflector 25 and also the monitored pressure level, the controller 9 operates to regulate the opening amount of the valves 5 and 7 for varying the vacuum level or the furnace pressure as well as to regulate the thyristor 10 for adjusting the furnace temperature. A control of the debinding process will be discussed with reference to FIG. 10 which illustrates relationships among furnace pressure, temperature, and reflectance of the monitor member 25. At the initial stage of raising the furnace temperature, no substantial decomposition of the organic binder will take place to generate no cracked gas to be deposited on the reflector 25 which is maintained at a temperature of 50° C. Therefore, the controller 9 sees no remarkable reduction in the reflectance and maintains the furnace temperature at a high level of vacuum. As the furnace temperature is increased to initiate the decomposition, the resulting cracked gas removed from the powder compact will begin to be deposited on the cooled reflector 25 to thereby reducing the reflectance. Subsequently, when the furnace temperature rises further to an elevated temperature where the decomposition occurs intensively, the cracked gas is generated in a correspondingly greater amount to thereby remarkably lower the reflectance. At this occurrence, the controller 9 responds to lower the heating rate as well as to lower the vacuum level, or increase the furnace pressure by regulating the valves 5 and 7, whereby the volume of the cracked gas in the powder compact is kept at a reduced level enough to cause no unacceptable defect in the powder compact. Although the present embodiment utilizes the reflector 25 as the monitor member in combination with the laser beam for monitoring the condition of the powder compact being debinded, the present invention should not be limited thereto and may utilizes a transparent monitor member in combination with a like laser beam, other light beam, or sound beam to examine transmissivity through the transparent monitor member as indicative of the condition of the powder compact.

Sixth Embodiment

Figure 11:
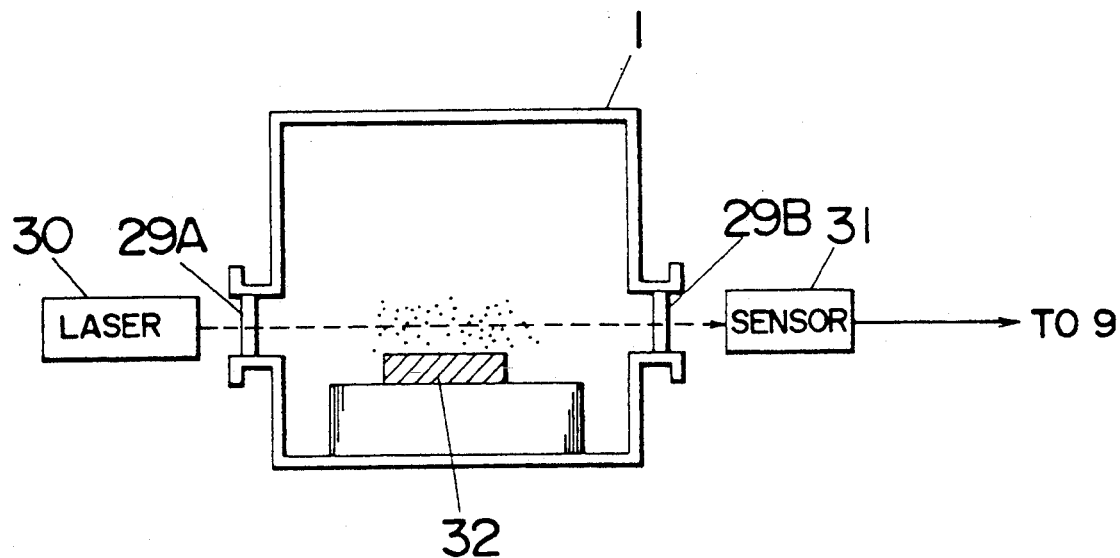
FIG. 11 is a schematic view of a furnace with a laser beam source and photo-sensor utilized in a debinding process in accordance with a sixth embodiment of the present invention.
Figure 12:
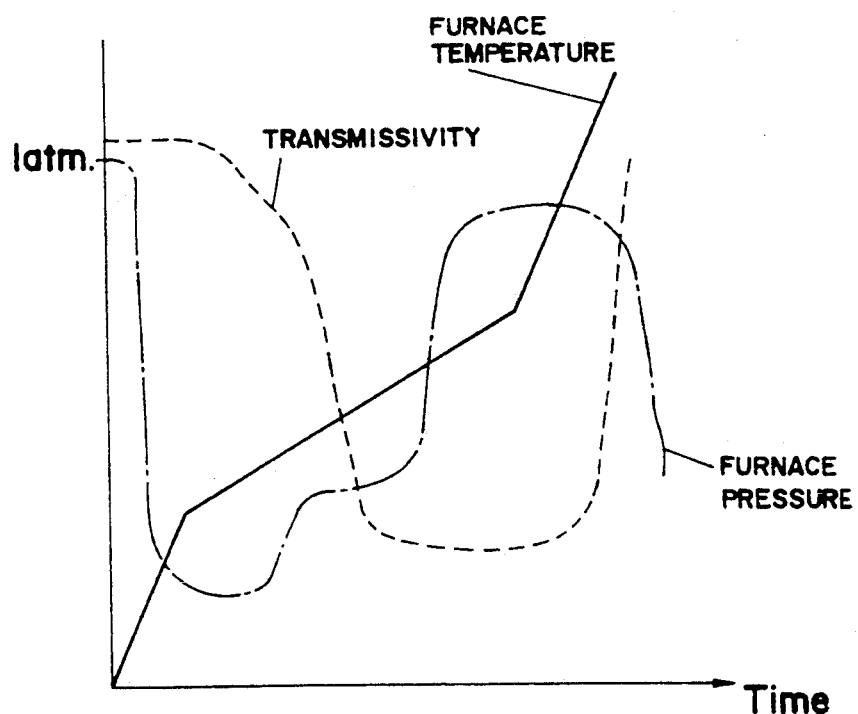
FIG. 12 is a graphical representation of changes in furnace pressure, temperature, and transmissivity of a space around the powder compact within the furnace of FIG. 11.
Figure 13A:
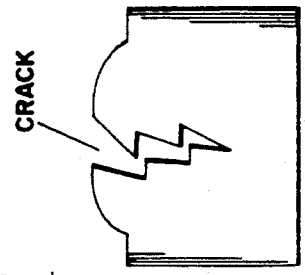
FIG. 13, composed of FIGS. 13A to 13D, is a diagram schematically illustrating a problem seen in a conventional process of removing an organic binder from a powder compact.
Figure 13B:
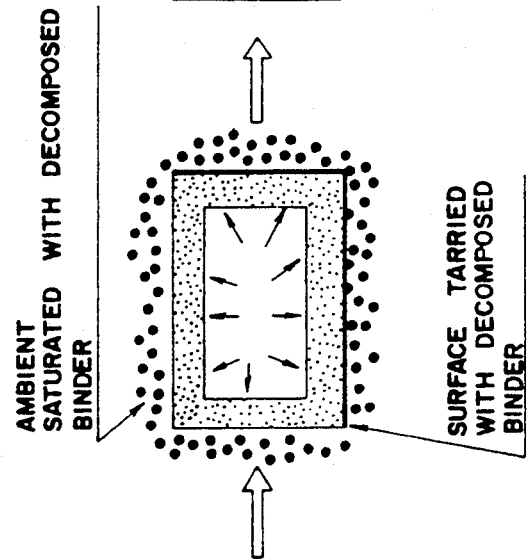
Figure 13C:
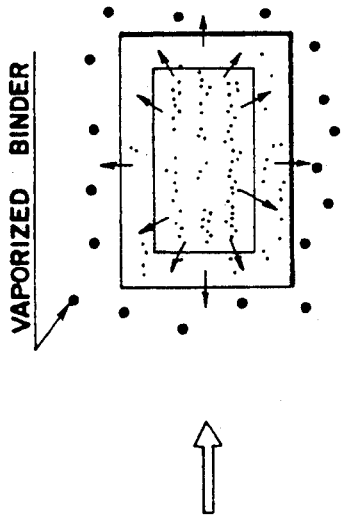
Figure 13D:
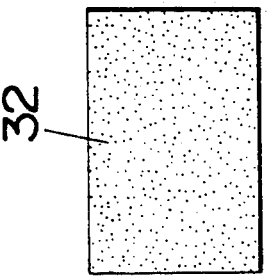

In a sixth embodiment of the present invention, a region within the furnace adjacent the powder compact being heated is monitored as indicative of the condition of the power compact in order to control the heating rate and the vacuum level of the furnace based upon the monitored condition. A system configuration utilized in this embodiment is identical to that of FIG. 1 but additionally includes, as shown in FIG. 11, a laser beam emitter 30 directing a He - Ne laser beam through a window 29A into the furnace 1 immediately above the powder compact 32, for example, 1 cm above the compact. A photo-sensor 31 is provided to receive the laser beam directed through another window 29B and provides an output which is related to the transmissivity of the laser beam through within the furnace 1 to the controller 9. As shown in FIG. 12, at the initial stage of heating the powder compact, no decomposition is seen and therefore no cracked gas in seen in the furnace 1 so that the photo-sensor 31 outputs a maximum transmissivity. At this condition, the controller 9 responds to operate to lower the furnace pressure while increasing the heating rate. When the temperature rises further, the decomposition is initiated to generate a corresponding amount of the cracked gas which will flow over the powder compact 32 to thereby begin to lower the transmissivity. Subsequently, when the temperature is further raised to cause the organic binder to be intensively decomposed, the cracked gas is generated in a greater amount to thereby remarkably lower the transmissivity. Such condition is acknowledged at the controller 9 which responds to lower the furnace pressure and at the same time to lower the heating rate of the furnace, respectively by regulating the valves 5 and 7 and by regulating the thyristor 10. With this control, it is possible to moderately decompose the organic binder and to restrain the undesirable expansion of the cracked gas in the powder compact, thus assuring completion of the debinding without causing a crack or blister in the debinded powder compact.

What is claimed is:

1. In a debinding process of heating a powder compact shaped from a mixture of a sinterable powder and an organic binder to remove an excess amount of said organic binder from said powder compact, an improvement comprising:

monitoring a temperature of a furnace; and heating said powder compact within said furnace at a pressure lower than an atmospheric pressure, while variably controlling said pressure in accordance with a varying temperature of said furnace, so as to control an amount of cracked gas generated.

2. In a debinding process of heating a powder compact shaped from a mixture of a sinterable powder and an organic binder to remove an excess amount of said organic binder from said powder compact, an improvement comprising:

heating said powder compact within a furnace at a pressure lower than an atmospheric pressure;

detecting a variation in density of a particular component of a cracked gas being generated by thermal decomposition of said organic binder; and controlling to vary a heating rate as well as said furnace pressure in accordance with said density variation.

3. In a debinding process of heating a powder compact shaped from a mixture of a sinterable powder and an organic binder to remove an excess amount of said organic binder from said powder compact, an improvement comprising:

heating said powder compact within a furnace at a pressure lower than an atmospheric pressure;

detecting a variation in volume of a particular component of a cracked gas being generated by thermal decomposition of said organic binder; and controlling to vary a heating rate as well as said furnace pressure in accordance with said volume variation.

4. In a debinding process of heating a powder compact shaped from a mixture of a sinterable powder and an organic binder to remove an excess amount of said organic binder from said powder compact, an improvement comprising.

heating said powder compact within a furnace at a pressure lower than an atmospheric pressure;

detecting a decrease in weight of said organic binder caused by thermal decomposition thereof;

controlling to vary a heating rate as well as said furnace pressure in accordance with said weight decrease of said organic binder in said powder compact.

5. In a debinding process of heating a powder compact shaped from a mixture of a sinterable powder and an organic binder to remove an excess amount of said organic binder from said powder compact, an improvement comprising:

heating said powder compact within a furnace at a pressure lower than an atmospheric pressure;

placing within said furnace a monitor member kept at a temperature below a condensation temperature of said organic binder to be capable of condensing thereat a cracked gas having been generated by thermal decomposition of said organic binder from said powder compact, directing a light beam or a sound wave to said monitor member to detect transmissibility or reflectance thereof; and controlling to vary a heating rate as well as said furnace pressure in accordance with the detected transmissibility or reflectance of said monitor member.

6. In a debinding process of heating a powder compact shaped from a mixture of a sinterable powder and an organic binder to remove an excess amount of said organic binder from said powder compact, an improvement comprising:

heating said powder compact within a furnace at a pressure lower than an atmospheric pressure;

directing a light beam or a sound wave to a space around said powder compact to detect transmissibility or reflectance thereof; and controlling to vary a heating rate as well as said furnace pressure in accordance with the detected transmissibility or reflectance of said space.

7. In a debinding process of heating a powder compact shaped from a mixture of a sinterable powder and an organic binder to remove an excess amount of said organic binder from said powder compact, an improvement comprising:

monitoring a temperature of a furnace; and heating said powder compact with said furnace at a pressure lower than an atmospheric pressure, while variably controlling said pressure in accordance with a varying temperature in such a manner as to lower the pressure to near a vacuum level when the temperature is detected to be within a first temperature range where the degradation reaction is expected to be less intense and therefore less volume of cracked gas being generated and to raise the pressure to near atmospheric pressure level when the temperature is detected to be within a second temperature range where the degradation reaction is expected to become intense to generate correspondingly increased volume of cracked gas.

* * * * *